July 14, 1964   W. S. HUNTER   3,140,712
ARTICULATED JOINTS
Filed Aug. 17, 1961

*INVENTOR.*
William S. Hunter
BY

United States Patent Office 3,140,712
Patented July 14, 1964

3,140,712
ARTICULATED JOINTS
William S. Hunter, 356 Greenwich St.,
San Francisco, Calif.
Filed Aug. 17, 1961, Ser. No. 132,038
2 Claims. (Cl. 128—92)

This invention relates to articulated joints. More particularly, it relates to the articulation found between two bones or simulated bones of the type that permits the bones to be both pivotal and slidable with respect to one another.

The principal objects of the present invention is to provide means whereby such a slidable and pivot joint may be artificially created so that the relative action of the member bones closely approximates that found in naturally occurring joints of the same type.

With reference to the accompanying drawings, FIG. 1 shows in side section the joint formed between the hip and thigh bone of the human and embodying the present invention.

Figure 1:
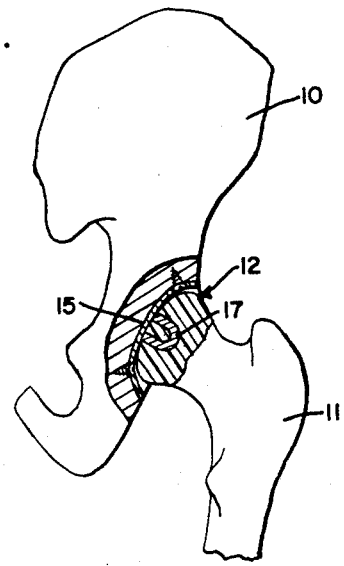

The member bones in all movable animal bone joints have relative movement at least to some degree in more than one plane and about more than one axis, although the primary motion might be restricted to one plane and about one axis. In other words, all pivot joints also have at least some relative slidable movement between the bone members. Typical joints in the human body exhibiting such a plurality of movement include all of the major articulated joints such as the knee, shoulder, elbow, hip joint, and the like.

The joints are permitted such a complexity of motion by virtue of their manner of construction. Thus, joints are held together by two types of forces including (1) muscles and ligaments, and (2) a vacuum within the joint and between the component bone members which exerts a suction which draws or urges the bone members towards each other. This "vacuum" in the hip joint for example, is strong enough to support substantially more than the 15 or 20 lbs. which the entire leg normally weighs.

Prior prosthetic devices such as artificial legs have successfully simulated the cohesive or connecting action of the muscles and ligaments which normally maintain the leg or thigh bone in proper position. Such devices have not been altogether successful, however, since they do not permit the entire freedom of movement found in the naturally occurring joints. Thus, prior devices have not been able to fully simulate both the pivot and slidable nature of natural joints. This has been primarily due to the failure to supply a replacement for the vacuum or suction aspect of the cohesive force on the joints found in nature.

The present invention provides cohesive means which permits the paralleling of both types of naturally occurring joining forces. As embodied in a suitable joint, the invention comprises a first bone member and a second bone member positioned to form an articulation between one end of each member.

The desired result is achieved with magnet means that is associated with the articulated end of the first bone member and magnetizable means associated with the articulated end of the second bone member. As a result, a magnetic force is created between the articulated ends which is operable to urge the ends of the bone members toward each other while permitting relative motion with respect to each other in a plurality of planes and/or axes.

It is contemplated that the present invention will find application in the prosthetic device art, principally in respect to artificial limbs. It further is contemplated that the invention will find application in the construction of anatomical models so that the joints will be more life-like and also in the field of realistic dolls, particularly puppets.

The embodiment illustrated in the drawings shows a hip or pelvis bone 10 properly juxtaposed in relation to the upper leg bone or thigh bone 11. An articulation or joint 12 is formed at the interface of hip bone 10 and thigh bone 11.

More specifically, the articulation 12 is formed from a socket 13 defined by hip bone 10 and a contoured end 14 of thigh bone 11 that is designed to nest within socket 13. In the naturally occurring joint, contoured end 14 is maintained within socket 13 by muscles and ligaments and also by a vacuum between contoured end 14 and the interior surface of socket 13.

The present invention artificially duplicates the vacuum or suction by means of a magnetizable metal cup 15 adapted to conform to and nest within socket 13. Preferably cup 15 is made from a non-rusting metal. Cup 15 is held in place within socket 13 by a plurality of screws 16 inserted through holes 18 of cup 15 and into hip bone 10. Thigh bone 11 contains a horseshoe magnet 17 embedded within its contoured end 14.

Figure 2:
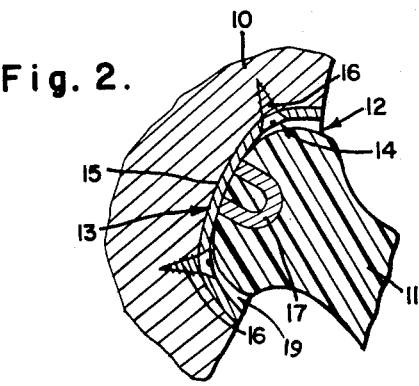
FIG. 2 shows in enlargement the area surrounding the articulation between the hip bone and thigh bone shown in FIG. 1.
Figure 3:
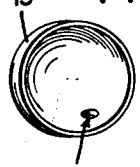
FIG. 3 shows in perspective the magnetizable cup inserted in the hip bone shown in FIGS. 1 and 2.
Figure 4:
FIG. 4 shows in perspective the magnet inserted in the thigh bone shown in FIGS. 1 and 2.

From the drawing, FIG. 2 in particular, it will be seen that cup 15 and horseshoe magnet 17 are embedded or otherwise placed in suitable position so that a magnetic force will be developed between cup 15 and magnet 17 and thereby urge thigh bone 11 toward hip bone 10. The actual location of the magnet and magnetizable means (cup 15) should be selected so that the magnet is operable to exercise its magnetic attraction for the magnetizable means to the desired extent.

Magnet 17 is selected so that the force developed between it and cup 15 will be sufficient to equal the force developed by the vacuum or suction found in the naturally occurring joint. As a result, a joint constructed in accordance with the foregoing embodiment will be both pivotal and slidable in a manner comparable to the movement of the natural joint.

The magnetizable means or cup 15 is to be fixed to or inserted within one end of one of the bones participating in the joint. In the case of a bone such as the hip bone, however, the term "end" is not as meaningful as in the case of, for example, the thigh bone. As used throughout the specification and claims, the term "end" should be construed to mean that portion of the bone contacting or approaching the other bone which forms the type of joint herein discussed.

In the case of prosthetic devices, thigh bone 11 will normally not be an actual or natural bone but will rather be a bone-like member approximating the shape and weight of a real bone. No distinction is made herein as between actual bones or synthetic bone-like members, and the magnetic means and magnetizable means may be associated with either bones or bone-like members whereever either is more suitable.

The magnetic means and magnetizable means are associated with the appropriate portions of the bones forming the joint by any suitable means. In the embodiment illustrated the magnetizable means is merely screwed to the bone. The magnet is embedded within the other bone member 11. Where thigh bone 11 is an artificial member made from plastic or other suitable material, the magnet 17 may be easily embedded during the formation or molding of the bone as will be obvious to those skilled in the art. Alternatively, suitable incisions may be made in natural bones for implanting the magnet.

As illustrated, magnet 17 is a horseshoe magnet and is preferred for the relatively high forces developable per unit size. However, other shapes of magnets may be used where more suitable. Alternatively, electro-magnets may be used in place of the type of magnet illustrated.

The embodiment illustrated shows the use of a magnet in one bone and a non-magnetized piece of metal associated with the other bone, with the force being developed by the attraction of the magnet for the metal. Equally suitable would be the inclusion of a magnet in both bone members. Thus, cup 15 could be replaced by another magnet whereby the magnetic force between the articulated ends would be created by the attraction of both articulated ends for each other. Hence, the term "magnetizable" means or material as used in the specification and claims hereof is meant to include both permanent magnets as well as non-magnetized magnetizable material.

It is appreciated that the articulated bone joint which has been illustrated in the drawings and described herein generally resembles what is commonly referred to as a ball and socket-type of hinge connection. However, it is noted that the articulated members defined by socket 13 and the contoured end 14 of the bone 11 are not formed as hinges or as the segments of perfect spherical objects.

More specifically, I am aware that various types of ball and socket hinges and connections have been utilized in many fields and application of use whereby unrestricted or universal peripheral motion of one member is made possible in reference to the other member to which the former is hinged. However, the ball and socket connections with which I am familiar include ball and socket parts which are complimentally shaped in the form of spherical segments—i.e. both the ball and socket are contoured to define spheres or segments of spheres having a common radius of curvature.

In articulated bone joints as the same occur in humans and other animal anatomies, neither the socket nor the bone portion that fits within the socket are formed as segments of perfect spheres. To the contrary such parts are irregularly contoured and define complex or irregular curvatured surfaces presenting in different localized areas different radii of curvature. As a consequence such parts in nature not only provide a relative pivotal or swinging movement as is common to all type of hinged joints including conventional ball and socket connections, but require that the parts be permitted to relatively laterally shift or slide in reference to one another. For example, in the typical simulated hip joint as shown in the attached drawings and described herein, the contoured end of the bone is not precisely complimentally contoured or shaped in reference to its co-acting hip joint and neither the bone end nor the socket, as above noted, are formed as segments of perfect spheres. (Note space 19.)

Consequently, the contoured bone end has a certain amount of freedom to shift or slide laterally within its socket in the direction of the pivot axis which movement is distinct, separate and apart from a simple pivot movement obtained between the two bones.

In the case of joints other than the ball and socket type illustrated, the same phenomenon is observable, perhaps to an even larger degree since there is no socket to restrict movement of the one bone with the other even in a general sense. For example, the human knee joint comprises, in addition to the knee cap, the junction between two elongated bones (the femur and the tibia). There is no ball and socket and the only means for limiting lateral shifting between the bone ends are the muscles, ligaments and vacuum forces.

By employing magnetism to maintain the joined parts in their relative proper positions, I have made it possible to substantially precisely simulate the complex articulated motions of the bone joints as they occur in nature. As previously mentioned, this is accomplished because the magnetic forces parallel the vacuum or suction forces found in natural joints.

Although the foregoing invention has been described in some detail, it is understood that certain changes and modifications may be practiced within the spirit of the invention and scope of the appended claims.

What is claimed is:

1. In the art of articulated prosthetic devices and medical arts mannequins, a joint whose members are both pivotally and laterally slidable with respect to each other comprising, a first member with an engaging end convexly contoured in the general shape of a spherical segment of first radius, a second member having a socket for cooperative engagement with said first member's engaging end, said socket concavely contoured in the general shape of a flattened spherical segment whose spherical segment's radius is greater than said first radius so that constant contact occurs throughout said pivotal and lateral sliding, and magnet means holding said first and second members in said cooperative engagement.

2. In the art of articulated prosthetic devices and medical arts mannequins, a joint whose members are both pivotally and laterally slidable with respect to each other comprising, a first member with an engaging end convexly contoured in the general shape of a spherical segment of first radius, a second member having a socket concavely contoured in the general shape of a flattened spherical segment whose spherical segment's radius is greater than said first radius, said engaging end cooperatively received in said socket, a magnet imbedded in said engaging end, a cup formed from magnetizable material conforming with and imbedded in said socket, said magnet being operable to attract said magnetizable cup and thereby maintain said first member in substantially constant contact with said socket, whereby the magnet attractive forces will simulate the forces created by the vacuum found in natural joints of said pivotally and laterally slidable type, and thereby permit comparable relative movement between the said first and second members.

References Cited in the file of this patent

UNITED STATES PATENTS

| | | |
|---|---|---|
| 2,661,480 | Rosen | Dec. 8, 1953 |
| 2,765,787 | Pellet | Oct. 9, 1956 |

FOREIGN PATENTS

| | | |
|---|---|---|
| 514,679 | Italy | Feb. 10, 1955 |